United States Patent [19]

Ingelström et al.

[11] 4,300,952
[45] Nov. 17, 1981

[54] CEMENTED HARD METAL

[75] Inventors: Nils A. Ingelström, Bromma; Leif A. E. Akesson, Stockholm, both of Sweden

[73] Assignee: Sandvik Aktiebolag, Sandviken, Sweden

[21] Appl. No.: 15,889

[22] Filed: Feb. 28, 1979

[30] Foreign Application Priority Data

Feb. 28, 1978 [SE] Sweden ............................... 7802236

[51] Int. Cl.³ .................... C22C 29/00; C22C 1/05
[52] U.S. Cl. ............................... 75/238; 75/203; 75/204; 75/205; 75/241; 75/242; 75/244
[58] Field of Search ............ 75/238, 241, 242, 244, 75/203, 204, 205

[56] References Cited

U.S. PATENT DOCUMENTS

| | | | |
|---|---|---|---|
| 3,971,656 | 7/1976 | Rudy | 75/244 X |
| 3,994,692 | 11/1976 | Rudy | 75/238 X |
| 4,049,876 | 9/1977 | Yamamoto et al. | 75/238 X |
| 4,101,318 | 7/1978 | Rudy | 75/241 X |
| 4,120,719 | 10/1978 | Nomura et al. | 75/238 |
| 4,145,213 | 3/1979 | Oskarsson et al. | 75/242 X |
| 4,150,984 | 4/1979 | Tanaka et al. | 75/238 |
| 4,212,671 | 7/1980 | Ettamayer et al. | 75/238 |

FOREIGN PATENT DOCUMENTS 2803024  8/1978  Fed. Rep. of Germany ........ 75/238

*Primary Examiner*—Richard E. Schafer
*Attorney, Agent, or Firm*—Burns, Doane, Swecker & Mathis

[57] ABSTRACT

An improvement in a cemented hard metal is disclosed. A molybdenum-tungsten-carbonitride is disclosed having the structure of tungsten carbide wherein the molybdenum and/or tungsten are at least partly substituted for by a metal selected from the group consisting of Cr, Nb, Ta, V, Re and mixtures thereof. The carbonitride may be mixed with a binder metal and sintered in a conventional manner to form a dense, substantially pore-free material.

10 Claims, No Drawings

CEMENTED HARD METAL

BACKGROUND OF THE INVENTION

Cemented hard metal (or sintered hard metal) is used in cutting tools for chipforming machining of metal materials, in high-strained tools and in wear parts of all kinds. Generally, the cemented hard metal contains hard materials (or hard principles), usually consisting mainly of tungsten carbide with small amounts of titanium carbide, tantalum carbide, niobium carbide, hafnium carbide and vanadium carbide in an amount of 70-97% by weight and 3-30% by weight of so-called binder metals, usually being cobalt, nickel, iron or their alloys.

Tungsten carbide has many properties which make it especially suited for use as a hard material in cemented hard metals. It has, for example, great hot hardness and high strength. Furthermore, the wettability between WC and binder metals such as Co is excellent. These properties are particularly related to the abovementioned hexagonal structure. Many attempts have been made to substitute other hard materials for the relatively expensive tungsten carbide, but this has either failed or has given rise to products with changed or impaired properties. Attempts to substitute for the W in the tungsten carbide, either partly or completely, with the related metal Mo has in most cases, demanded special procedures which have turned out to be completely uneconomical, or has given rise to hard materials with unsatisfactory stability, particularly at high temperatures.

However, as described in related U.S. Patent Application Ser. No. 872,926, filed Jan. 27, 1978, it has been found that a molybdenum-tungsten-carbonitride (Mo,W)(C,N), having the same type of structure as WC and a better thermal stability than the corresponding molybdenum-tungsten-carbide (Mo,W)C, can be obtained by means of relatively simple and economical methods of manufacture. The molybdenum-tungsten-carbonitride normally has a nitrogen content of 0.05–0.5 percent by weight, but may have a nitrogen content of up to about 1.2–1.5 percent by weight at high concentrations of molybdenum.

OBJECTS AND SUMMARY OF THE INVENTION

It is an object of this invention to provide a Mo-W-carbonitride wherein the Mo and/or W have been at least partly substituted for by other metals in order to provide a more stable compound.

It is also an object of this invention to provide a Mo-W-carbonitride wherein the Mo and/or W have been at least partly substituted for by other metals to provide a carbonitride having the same structure as that of tungsten carbide.

It is furher an object of this invention to provide a process for the formation of a Mo-W-carbonitride wherein the Mo and/or W have been at least partly substituted for by other metals.

It is still further an object of this invention to provide a cemented hard metal utilizing a Mo-W-carbonitride wherein the Mo and/or W have been at least partly substituted for by other metals.

In one aspect of the present invention there is provided a cemented hard metal comprising one or more hard materials in an amount of 70 to 97 percent by weight and a binder alloy of iron group metals in amounts of 3 to 30 percent by weight, the hard material consisting of at least 20 percent by weight of a molybdenum-tungsten-carbonitride having the structure of tungsten carbide with the molybdenum and/or tungsten being at least partly substituted for by a metal selected from the group consisting of Cr, Nb, Ta, V, Re and mixtures thereof.

In another aspect of the present invention there is provided a carbonitride having the composition $(M_xMo_yW_z)$ (C, N) wherein M is selected from the group consisting of Cr, Nb, Ta, V, Re and mixtures thereof and in which $x = >0$ and up to 0.3
$y = 0.0-0.95$
$z = 0.05-0.95$
and $x+y+z = 1$ In yet another aspect of the present invention there is provided a method of making a molybdenum-tungsten-carbonitride having the structure of tungsten carbide wherein molybdenum, tungsten, and carbon in proportions sufficient for formation of the monocarbide, are heated in nitrogen-containing atmosphere at a temperature sufficient to form the said molybdenum-tungsten-carbonitride, the improvement comprising substituting at least one metal M selected from the group consisting of Cr, Nb, Ta, Va, Re and mixtures thereof at least partly for the molybdenum and/or tungsten so as to form a carbonitride having the composition $(M_xMo_yW_z)$ (C, N) in which $x = >0$ and up to 0.3
$y = 0.0-0.95$
$z = 0.05-0.95$
and $x+y+z = 1$

DETAILED DESCRIPTION OF THE INVENTION

It has been surprisingly found that the hexagonal Mo-W-carbonitride which is unstable in certain respects can be further stabilized by substituting, partly or completely, other metals such as Cr, Nb, Ta, V and/or Re for Mo and/or W. The atomic radius of these elements is of such size that the carbonitride lattice will not be significantly distorted. Thus, by means of the present invention, further alternatives have been disclosed to provide substitutes for the expensive, and in certain cases rare, tungsten raw materials. These alternatives also mean that cheaper or more prevalent raw materials can be substituted for the molybdenum and/or tungsten with Mo-W-carbonitrides.

The invention relates to a sintered hard metal or cemented hard metal consisting of one or more hard materials or principles in an amount of 70-97% by weight, and a binder metal or alloy of the iron group metals of the periodic system in an amount of 3-30% by weight. The cemented carbide of the present invention is characterized in that the hard material portion consists of at least 20, usually at least 30, preferably at least 50%, of molybdenum-tungsten-carbonitride having the structure of the tungsten carbide with the molybdenum and/or tungsten being at least partly substituted for by a metal selected from the group consisting of Cr, Nb, Ta, V, Re and mixtures thereof.

The new carbonitride of this invention has the composition $(M_xMo_yW_z)$ (C,N) wherein M is selected from the group consisting of Cr, Nb, Ta, V, Re and mixtures thereof and in which $x = >0$ and up to 0.3

$y = 0.0 - 0.95$
$z = 0.05 - 0.95$
and $x + y + z = 1$

Tungsten carbide has in recent years been employed as a catalyst material in fuel cells for the combustion of hydrogen gas, since WC has catalytic properties similar to those of platina (R. B. Levy, M. Boudart, Science 181, 547 (1973)). The hexagonal $(Cr_xMo_yW_z)(C,N)$ of this invention has a catalysing influence similar to platina, particularly in oxidizing reactions with hydrogen, and that in many cases the activity can be greater than that of pure WC. This can, among other things, be attributed to the improved possibilities to obtain an extremely fine-grained product ($<1$ à $2$ $\mu m$) compared to WC. The presence of Cr also increases the corrosion resistance compared to WC. In certain cases the actual carbonitride has proven to be superior to Pt, for example, when high hardness and great wear resistance are demanded, particularly at increased temperatures.

The reason why the carbonitrides of this invention can be used in electrochemical oxidizing processes may be ascribed to the great density of d-electrons at and immediately below the Fermi level (platina shows a similar behaviour). By balancing the share of Cr-, Mo- and W-atoms, respectively the electron density at the Fermi-level can be affected. This will also have an influence upon the magnetic properties of the crystal which in turn influences the catalysing effects. The exact mechanism regarding this influence is not yet understood, however. An influence on the catalysing effect has also been found by doping the carbonitride with other metals. That is, elements belonging to the groups 4B, 5B and 6B of the periodic system, and Re. The hexagonal (Cr,Mo,W)-carbonitride can serve partly as a complement and partly as a substitute for Pt in fuel cells and thus serves to decrease the need for platinum.

Nitrogen contents between about 0.05 and about 15 atomic percent can also be reached within the carbonitrides of this invention. This corresponds to nitrogen contents of up to about 3 percent by weight in the carbonitride, which can be obtained at essential contents of Cr (or other nitride formers). Preferably, however, the carbonitride contains between about 0.05 and about 8.0 atomic percent nitrogen, which corresponds to a nitrogen content of up to about 2 percent by weight.

Chromium-molybdenum-tungsten-carbonitride with a hexagonal WC-structure can be prepared by heating Mo, W and Cr, possibly in bound form, together with C in a ratio sufficient for formation of the mono-carbides, in a nitrogen containing atmosphere, preferably at temperatures between 1000° and 1500° C. Above 1500° C., a phase $\eta$-$M_3$(C,N)$_2$ is formed, in which M stands for Cr, Mo and/or W. Below 1000° C. the reaction proceeds too slowly to be able to be used economically.

As the starting material, mixtures of metal powders of molybdenum, tungsten and a third metal selected from the group consisting of Cr, Nb, Ta, Va, Re and mixtures thereof with carbon can be provided in such a ratio that the sum of the gram atom numbers of the metals is the same as the gram atom number of the carbon.

The starting material can also be mixtures of the carbides of molybdenum ($Mo_2C$), tungsten ($W_2C$ and/or WC) and the third metal added together with carbon in such a ratio that the total carbon content in gram atom amounts is the same as the sum of the gram atom numbers of the metals.

According to another embodiment of the method, there are used as starting materials, mixtures of the ammonium salts of the respective acids of the metals (e.g., molybdic and tungstic acids) with carbon, the amount of carbon being so adjusted, that there after the removal of oxygen remains sufficient carbon for forming—with the metals and nitrogen—a carbonitride having the composition (M,Mo,W)(C,N), wherein M=Cr, Nb, Ta, Va, and/or Re.

Furthermore, it is possible to use mixtures of the oxides of the metals with carbon as starting materials. In this embodiment, the amount of carbon is adjusted so that after the reduction of the oxide there still remains sufficient amounts of carbon for forming with the metals and nitrogen a carbonitride having the composition (M,Mo,W)(C,N), wherein M=Cr, Nb, Ta, Va, and/or Re.

Co-precipitated acids of Mo and W, e.g., $H_2(Mo,W)O_4$ or mixtures of Mo- and W-acids can be used as starting materials. Co-precipitated compounds of molybdenum containing ammonium-para-tungstate are also suitable. These can be prepared by neutralizing or evaporation of an ammoniacal solution of each oxide respectively.

It has been found that the addition of a chromium salt facilitates the precipitation since a very fine-grained chromium hydroxide is precipitated which acts as a nucleation former for the Mo- and W-compounds. In this way, in addition to Mo-W-compounds, Cr-containing Mo-W-compounds can also be prepared. It has also been found that the metal atoms Mo, W and Cr have to be mixed very intimately, often down to atomic level, in order to form the hexagonal carbonitride. Under these circumstances the reaction to (Cr,Mo,W)(C,N) can be completed even if $Cr_3C_2$ and/or $Mo_2C$, as an example, together with WC do not normally form a solid solution when these components are thermally treated together.

The formed carbonitride will usually be very fine-grained, but by means of an addition of some hundreths percent by weight of an alkali metal, e.g. Na, to the starting materials (before the formation of the oxide) the grain size of the hard material can be controlled.

As the nitrogen-containing atmosphere, the following gases have been found useful: a mixture of hydrogen and/or noble gas with nitrogen and/or ammonia, the ratio of their volume amounts of nitrogen-containing to non-nitrogen-containing gases being 19:1 to 1:9, preferably 3:1 to 1:3, ammonia as a stationary or flowing gas; nitrogen under normal or increased pressure, preferably up to 200 atmospheres, particularly 30–50 atmospheres; nitrogen under normal or reduced pressure, being partly ionized by electrical glow discharges in an electrical high tension field or by high frequency.

The unexpected formation of the carbonitride of this invention having the same structure as that of tungsten carbide may be explained by the fact that molybdenum—contrary to tungsten—cannot form any mono-carbide at sintering temperatures around 1400° C. In the presence of nitrogen, however, a carbon-rich molybdenum carbonitride with the structure of tungsten carbide can be formed.

The hexagonal carbonitride of this invention can also be used in various applications such as a hard material in a sintered cemented hard metal.

The sintered hard metal may be prepared according to the present invention by mixing the carbonitride of this invention with one or more metals of the iron group of the periodic system and, if desired, one or more additional hard materials (carbides, nitrides and carbonitrides of particularly the metals Ti, Zr, Hf, V, Nb, Ta, Mo and W). The powder mixtures are sintered in a conventional manner to a dense, substantially pore-free cemented carbide. As binder metals, cobalt or nickel in amounts of 3–30% are preferable. As sintering atmosphere, the normal protective gases, as for example hydrogen, noble gas or nitrogen or their mixtures, are suitable. Vacuum-sintering is also possible. Preferably, the sintering of the cemented carbide is performed in a nitrogen-containing atmosphere, the pressure being up to 200 atm, particularly up to 50 atm. The sintering temperature should be maintained between 1300° C. and 1500° C., particularly around 1375° to 1400° C. in order to avoid decomposition into $Mo_2C$ and free carbon, which reaction has a tendancy to increase with increasing temperatures. Also other carbides, nitrides or their mixed crystals, preferably TiC or a mixed crystal (Ti,W)C, TaC or a mixed carbide (Ta,W)C, (Ti,Ta)N or mixed crystals (Ti,Ta) (C,N) can be added to the mixed carbonitride (Mo,W) (C,N), in order to adjust the properties of the sintered materials to a particular use.

The invention is additionally illustrated in connection with the following examples which are to be considered as illustrative of the present invention. It should be understood, however, that the invention is not limited to the specific details of the examples.

EXAMPLE 1

A mixture of chromium nitrate, $MoO_3$ and $WO_3$ is dissolved in ammonia, in such amounts that the atomic ratio Cr/Mo/W is 10/45/45, and the atomic ratio Mo/W is 1:1, after which the solution is evaporated to about 95 percent. The precipitate is heated in air at 480° C. to form a mixed oxide of the metals Cr, Mo and W. This oxide is reduced with hydrogen at 950° C. for 2 hours, forming a metal powder which is single-phased and has the same structure as W according to X-ray diffraction measurements. The metal powder is mixed with carbon and heated in an atmosphere of 25 percent $H_2$ by volume and 75 percent $N_2$ by volume at 1300° C. for 4 hours. The amount of carbon is somewhat hyperstoichiometric (about 1.05–1.10 times the stoichiometric amount) in order to guarantee at least stoichiometric carbon content in all parts of the sample. There is obtained a product having 8.18 percent by weight of bound carbon, 0.08 percent by weight of free carbon, 0.27 percent by weight of nitrogen, 30.2 percent by weight of Mo, 3.6 percent by weight of Cr and 57.7 percent by weight of W. By X-ray investigations it is found that the product consists of a single-phase carbonitride having the same type of structure as WC and corresponding to the formula $(Cr_{0.10}Mo_{0.45}W_{0.45})$ (C,N).

EXAMPLE 2

The carbonitride of Example 1 is milled together with 12 percent by weight of Co and 1.5 percent by weight of a pressing agent in a 2.4 liter ball mill for 48 hours. After pressing and sintering at 900° C. in $H_2$ and 1400° C. in a vacuum, there are obtained dense test specimens of a cemented hard metal having a hardness HV 3 = 1500, bending strength 1360 $N/mm^2$ and density 11.1 $g/cm^3$.

EXAMPLE 3

Chromium is added as chromium nitrate dissolved in nitric acid to an aqueous ammonia solution obtained by dissolving $MoO_3$ and $WO_3$ in $NH_3$, with the atomic ratio Mo/W being 1:1. By acidification with nitric acid to a pH of 1.2 at 90° C., a fine-grained chromium containing molybdenum-tungsten acid is precipitated with the atomic ratio of Cr/Mo/W being 5/48/47. After cleaning, drying etc., the precipitate is calcined at 480° C. for 2 hours to a mixed oxide of Cr, Mo and W. This oxide is reduced with hydrogen at 910° C. for 3 hours to a single-phased metal powder having the same structure as tungsten according to X-ray diffraction analysis. The material is subsequently blended with carbon black and heated in flowing ammonia gas in a carbon tube furnace at 1000° C. for 5 hours followed by a temperature rise to 1450° C. which is maintained for 2 hours. The amount of carbon added is somewhat hyperstoichiometric in order to prevent possible decarburization. The product obtained has 7.74 percent by weight of bound carbon, 0.12 percent by weight free carbon, 0.38 percent by weight nitrogen, 31.3 percent by weight Mo, 1.8 percent by weight Cr and 58.7 percent by weight W. By X-ray investigations it is found that the product consists of a single-phased carbonitride having the same type of structure as WC. The compound corresponds to the formula $(Cr_{0.05}Mo_{0.48}W_{0.47})$ $(C_{0.96}N_{0.04})$.

The principles, preferred embodiments and modes of operation of the present invention have been described in the foregoing specification. The invention which is intended to be protected herein, however, is not to be construed as limited to the particular forms disclosed since these are to be regarded as illustrative rather than restrictive. Variations and changes may be made by those skilled in the art without departing from the spirit of the invention.

We claim:

1. A cemented hard metal comprising one or more hard materials in an amount of 70 to 97 percent by weight and a binder alloy of iron group metals in amounts of 3 to 30 percent by weight, the hard materials consisting of at least 20 percent by weight of a molybdenum-tungsten-carbonitride having the structure of tungsten carbide WC with the molybdenum and/or tungsten being at least partly substituted for by a metal selected from the group consisting of Cr, Nb, Ta, V, Re and mixtures thereof.

2. The cemented hard metal of claim 1 wherein the carbonitride has a nitrogen content within the range of 0.05–15 atomic percent.

3. The cemented hard metal of claim 1 wherein the carbonitride has the composition $(M_xMo_yW_z)$ (C,N) wherein M is selected from the group consisting of Cr, Nb, Ta, V, Re and mixtures thereof and in which
    $x = > 0$ and up to 0.3
    $y = 0.0–0.95$
    $z = 0.05–0.95$
    and $x+y+z=1$.

4. The cemented hard metal of claim 3 wherein M is Cr.

5. A carbonitride having the composition $(M_xMo_yW_z)$ (C,N) wherein M is selected from the group consisting of Cr, Nb, Ta, V, Re and mixtures thereof and in which
    $x = > 0$ and up to 0.3
    $y = 0.0–0.95$
    $z = 0.05–0.95$
    and $x+y+z=1$.

6. The carbonitride of claim 5 wherein M is Cr.

7. The carbonitride of claim 5 wherein the nitrogen content is within the range of 0.05–15 atomic percent.

8. In a method of making a molybdenum-tungsten-carbonitride having the structure of tungsten carbide WC wherein molybdenum, tungsten, and carbon in proportions sufficient for formation of the monocarbide, are heated in a nitrogen-containing atmosphere at a temperature sufficient to form the said molybdenum-tungsten carbonitride, the improvement comprising: substituting at least one metal M selected from the group consisting of Cr, Nb, Ta, Va, Re and mixtures thereof at least partly for the molybdenum and/or tungsten so as to form a carbonitride having the composition $(M_xMo_yW_z)$ (C,N) in which $x => 0$ and up to 0.3

$y = 0.0$–$0.95$ $z = 0.05$–$0.95$ and $x+y+z=1$.

9. The method of claim 8 wherein said carbonitride is formed at a temperature between 1000° and 1500° C.

10. The method according to claim 8 wherein the nitrogen-containing atmosphere contains a mixture of hydrogen and/or noble gas with nitrogen and/or ammonia, the volume ratio of nitrogen-containing gases to non-nitrogen-containing gases being 19:1 to 1:9.

* * * * *